C. L. DU BOIS.
FLEXIBLE COUPLING DISK.
APPLICATION FILED FEB. 26, 1919.

1,350,011.

Patented Aug. 17, 1920.

WITNESS:
Rob. W. Kitchel.

INVENTOR
Clarence L. DuBois
BY
Augustus B. Stoughton
ATTORNEY.

UNITED STATES PATENT OFFICE.

CLARENCE L. DU BOIS, OF CAMDEN, NEW JERSEY.

FLEXIBLE-COUPLING DISK.

1,350,011.  Specification of Letters Patent.  Patented Aug. 17, 1920.

Application filed February 26, 1919. Serial No. 279,258.

*To all whom it may concern:*

Be it known that I, CLARENCE L. DU BOIS, a citizen of the United States, residing at Camden, in the county of Camden and State of New Jersey, have invented certain new and useful Improvements in Flexible-Coupling Disks, of which the following is a specification.

The principal object of the present invention is to provide a flexible-coupling adapted to successfully operate under comparatively heavy loads and without oil or lubricant.

The invention will be claimed at the end hereof but will be first described in connection with the embodiment of it chosen for illustration in the accompanying drawings forming part hereof and in which—

Figure 1:
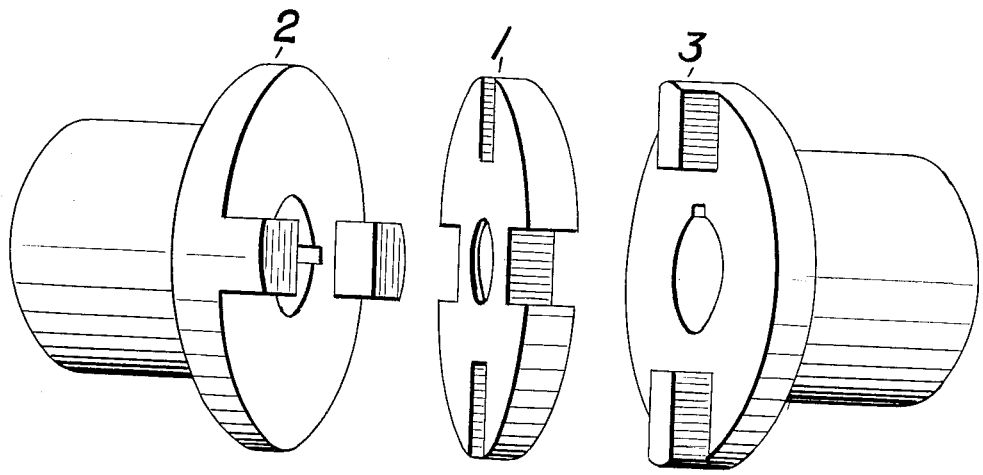
Figure 1, is a view illustrating a disk embodying features of the invention and showing the other parts of the coupling detached.
Figure 2:
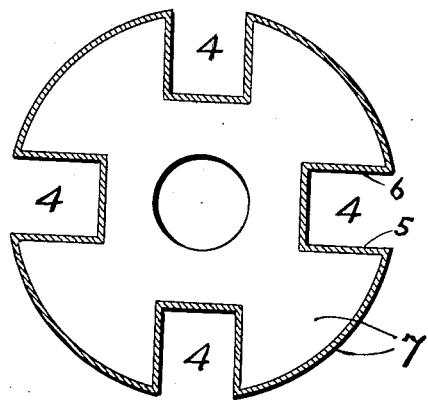
Fig. 2, is a sectional view taken on the line 2—2, of Fig. 3.
Figure 3:
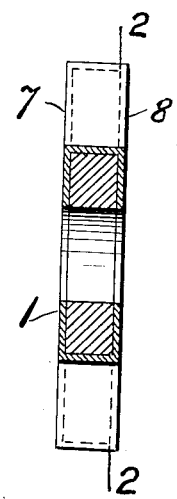
Fig. 3, is a transverse sectional view of the disk.
Figure 4:
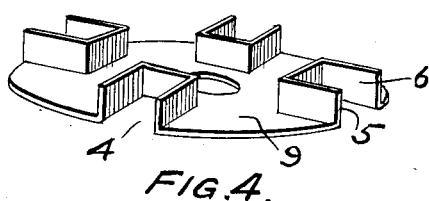
Figs. 4 and 5, are perspective views of modifications.
Figure 5:

The disk 1, for the flexible-coupling members 2 and 3, is provided with peripheral notches 4, having parallel side walls, and is further provided with a fiber lining for the working walls 5 and 6, of the notches. The material known in the trade as "fiber" and consisting of a tough, hard condensation product is the lining. A flexible-coupling disk having the working walls of its slots lined with this material will work satisfactorily without oil even under heavy duty and the disk itself may be constructed of steel. The lining 5—6, may be a part of a box-like structure, Figs. 2 and 3, the wall 7, of which completely covers the edge and one face of the disk, and the lid 8, of which completely covers the other face of the disk and abuts on the end of the wall 7. The lining for the working faces of the notches may be confined to the notches and carried by a disk 9, Fig. 4, adapted to cover one face of the disk, or the lining may be confined to the walls of the slots with the exception of fastening ear 11, Fig. 5.

I claim:

A flexible-coupling disk provided with peripheral notches extending clear through it and having parallel side walls, and provided with a fiber lining for the working walls of the notches, whereby the coupling can run without oil, substantially as described.

CLARENCE L. DU BOIS.